March 3, 1964     S. BALSBAUGH     3,123,751
LIQUID TEST CELL
Filed March 23, 1960
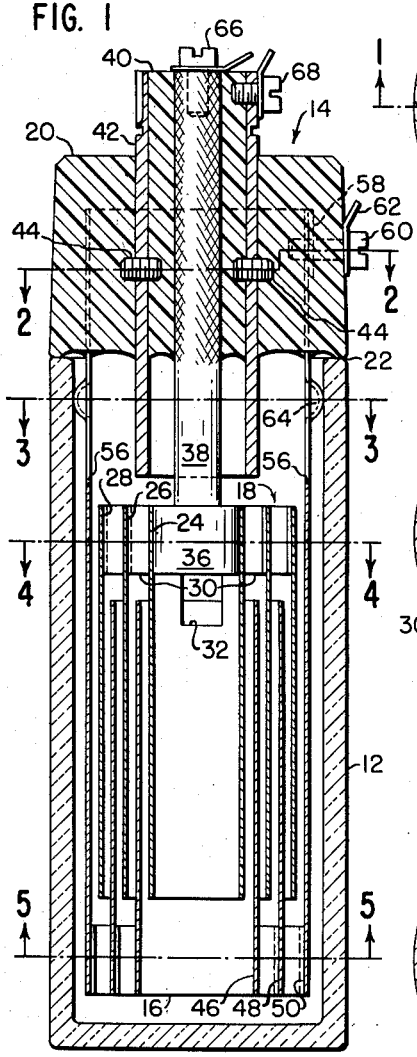
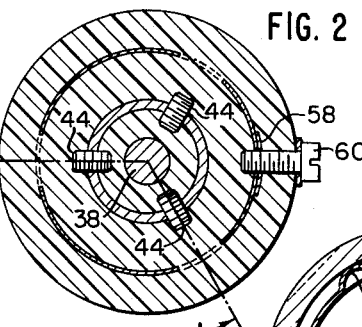
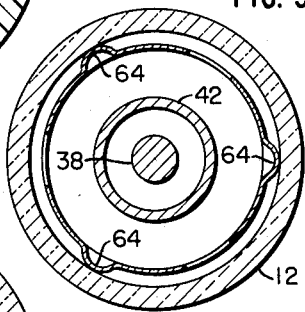
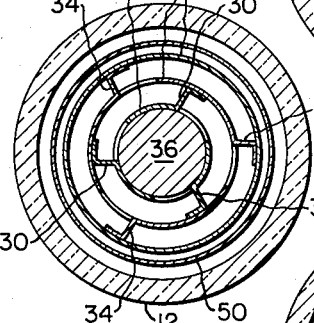
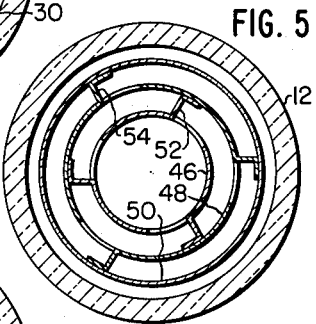
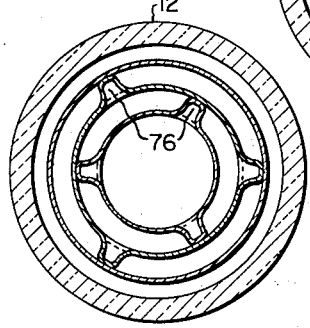
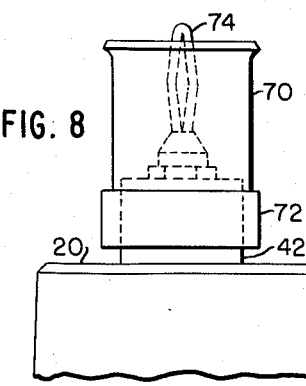
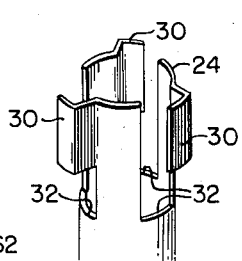
INVENTOR.
SYDNEY BALSBAUGH
BY
ATTORNEYS

United States Patent Office 3,123,751
Patented Mar. 3, 1964

3,123,751
LIQUID TEST CELL
Sydney Balsbaugh, 10 Cove St., Duxbury, Mass.
Filed Mar. 23, 1960, Ser. No. 17,148
3 Claims. (Cl. 317—246)

The present invention relates generally to instruments for measuring electrical properties of liquids. More particularly it relates to a test cell having provision to hold a sample of liquid to be tested and having terminals for connection to an external measuring circuit including a direct or alternating current supply, such circuit being adapted for measuring the alternating current power factor, dielectric constant, loss factor and conductivity of the liquid.

Test cells of the foregoing general type have been used for many years for measurement of properties of liquid dielectrics, plasticisers, mineral oils, varnishes, resins, solvents, hydrocarbons, chemical and electrolytic solutions and other liquids. Various forms of test cells have been used from time to time. In general, these cells include a sample holder for the liquid to be measured and a pair of spaced electrodes supported by an insulating head member and adapted to extend into the liquid. A pair of terminals are provided for connection of the electrodes to an external voltage source and associated measuring apparatus. In addition, a third terminal is frequently provided, this terminal being connected with a "guard" element supported in the head member and situated between the electrodes. The "guard" element may or may not be in contact with the liquid. The purpose and use of "guarded" cells of this type is also well known. It will suffice for present purposes merely to state that the guard element is so connected with the external measuring circuit as to eliminate any distortion of measurement data due to current leakage or field distortion between the electrodes through paths other than the liquid being measured.

The constructions hitherto proposed for two-terminal and three-terminal (guarded) test cells of the foregoing type have been generally unsatisfactory for applications requiring relatively large air capacitances between the measuring electrodes, coupled with rugged construction suitable for field use and durability over wide temperature ranges. In certain cells the measured results may be distorted by the presence of air bubbles trapped between the electrodes. Cells which have been found generally satisfactory in use have also been found to be expensive to manufacture. The cost of such cells reduces the frequency of their use in industry, and tends to confine the accurate measurement of the electrical properties of many liquids to the laboratory.

It is a principal object of this invention to provide a novel construction for a liquid test cell having a relatively high air capacitance with provision for a guard element, whereby the cell is relatively simple and inexpensive to manufacture and of rugged construction.

A second object is to provide a liquid test cell adapted for high D.C. voltage use in the field in insulation testers of the type currently in use.

A third object is to provide a construction adapted for operation throughout the temperature range from 0° C. to 100° C. and even greater ranges in some applications.

A fourth object is to provide a liquid test cell adapted to provide accurate measurements of the properties of liquids with a minimum of distortion due to air bubbles entrapped between the electrodes.

With the foregoing and other objects in view, the features of this invention reside in a novel combination of structural parts forming and supporting a plurality of concentric cylindrical tubes comprising a pair of electrode sets, the electrode sets being accurately supported in mutually spaced, concentric arrangement by means of an insulating head member. According to this novel construction one electrode set comprises a plurality of tubes mutually connected and supported concentrically only at one end, while the other electrode set has a generally similar construction but with tubes supported only at the opposite end.

According to a second feature, the accurate spacing of the tubes comprising each electrode set is effected through spacer tabs or protrusions integral with the tubes.

Another feature resides in a molded insulating head member which supports the two electrode sets and a guard element in rigid, accurately spaced positions.

Other features of the invention reside in certain details of construction and arrangements of the parts which will become evident from the following description of a preferred embodiment thereof, having reference to the appended drawings in which FIG. 1 is an elevation in section through the novel test cell, taken on radii substending an angle of 120°;

FIGS. 2 to 5 are views in section taken respectively on lines 2—2, 3—3, 4—4 and 5—5 of FIG. 1;

FIG. 6 is an elevation in section illustrating an alternative construction of the test cell;

FIG. 7 is a detail view in perspective showing the supporting end of a tube forming an element of one of the electrodes; and FIG. 8 illustrates a modification of the terminals for external circuit connection to a coaxial cable for capacitance measurements.

Referring to the drawings, there is illustrated a cylindrical glass sample holder 12 having a closed end and an open end. It will be understood that the holder 12 forms no part of the electrical circuit utilized in making the measurements, and it may be metallic if desired. An electrode assembly designated generally at 14 is adapted to be fitted into the open end of the holder 12. The assembly 14 is removed from the holder 12 in order to pour a measured quantity of the liquid to be tested into the latter. Then, the assembly 14 is fitted in the position illustrated in FIG. 1 so that a pair of measuring electrode sets 16 and 18 extend through the surface of the liquid. The elecrode set 16 is directly supported in a molded resinous head member 20 of generally cylindrical external shape, the latter being adapted to be supported at its periphery upon a shoulder 22 forming the open end of the holder 12.

The electrode set 18 comprises three concentric cylinders 24, 26 and 28 of identical length and shown in section in FIG. 4. FIG. 7 is a detail view of the tube 24 and shows three radially-extending tabs 30 subtending angles of 120° and formed by shearing and bending the metal of the tube, thereby also forming slots 32 of greater length longitudinally than the tabs. The tabs 30 fit snugly within the tube 26 and are securely fastened to it, preferably by spot welding. The tabs 30 are illustrated as being three in number, but it will be evident that a greater number of tabs, preferably equally spaced about the tube may be used if desired. The tube 26 has three tabs 34 similar to the tabs 30 which snugly fit within the tube 28. The tube 26 differs from the tube 24 in that the slots in the tube 26 created by the formation of the tabs preferably do not extend further longitudinally than the tabs 34. The tube 28 is of unbroken cylindrical shape and is secured to the tabs 34 in the manner previously described in relation to the tabs 30.

Slidably fitted within the tube 24 and secured thereto by spot welding or other suitable means is a cylindrical metallic plug 36 integral and coaxial with a central electrode support rod 38. The rod 38 is supported by an insulating sleeve 40 which is preferably made of the same material as the head member 20. The sleeve 40 is in turn enclosed in a cylindrical metallic guard tube 42 rigidly held in the head member 20. Threadedly received in the tube 42 are set screws 44 which are imbedded both in the sleeve 40 and in the head member 20 during the casting of the latter parts as hereinafter described. The guard tube 42 is coaxial with the rod 38 and extends downwardly to a point adjacent but somewhat longitudinally displaced from the upper ends of the tubes 24, 26 and 28.

The electrode set 16 is constructed in a manner similar to the electrode set 18. It preferably comprises cylindrical tubes 46, 48 and 50 radially spaced to be centrally in the interstices of the tubes 24, 26 and 28 as viewed in FIG. 1, thus forming an alternating sequence of tubes, the tubes 46 and 48 having radially extending tabs 52 and 54, respectively. The tabs 52 and 54 are respectively secured by spot welding to the tubes 48 and 50. The tube 50 isc longer than the tubes 46 and 48 and has three longitudinally extending slots 56 subtending angles of 120° which extend from points adjacent the upper ends of the tubes 24, 26 and 28 to the upper end of the tube 50. The tube 50 is firmly imbedded in the head member 20. A tab 58 at the upper end of the tube 50 is formed of the metal cut from one of the slots 56 and bent over to form a double thickness of metal. A threaded hole is passed through this double thickness to receive a machine screw 60. The screw 60 supports a solder lug 62 for making external connection to the electrode set 16.

The tube 50 is provided with three dimples 64 subtending angles of 120° (FIG. 3), which are expanded to the inner diameter of the sample holder 12. These serve to locate the electrode assembly 14 accurately within the holder 12.

Machine screws 66 and 68 with solder lugs are threadedly received in the support rod 38 and the guard tube 42 for making external connections thereto, respectively.

FIG. 8 shows an alternative means of external connection to the test cell particularly adapted for connection with a coaxial cable. To effect the alternative end connections, the machine screws 66 and 68 with their respective solder lugs (FIG. 1) are removed and a generally cylindrical metallic guard sleeve connector 70 with a locking collar 72 is received over and fastened to the guard tube 42 at its upper end. A banana plug 74 is threadedly received in the end of the support rod 38. Suitable connector means, not shown, adapted for fitting to the plug 74 and the sleeve connector 70 are provided on a coaxial cable extending from the external circuit. It will be understood that the electrode set 16 is connected with the external circuit through the solder lug 62 as in the case of FIG. 1.

The fabrication of the above-described assembly is relatively simple and inexpensive as compared with comparable prior art cells generally in use. The electrode sets 16 and 18 are first independently fabricated, assembled and welded together. The plug 36 is welded to the electrode set 18. Then the tube 50, the guard tube 42 and the support rod 38 are set up in a suitable fixture adapted for molding the head member 20 and the sleeve 40. Preferably, these parts are assembled in the mold upside down from their illustrated positions.

A suitably filled resinous composition is then poured into the mold so as to form the head member 20 and the sleeve 40 simultaneously. The set screws 44 and a screw having the same threads as the screw 68 are received in the guard tube 42 when the resinous material is poured in the mold, whereby the screws 44 firmly and permanently secure the bodies 20 and 40 to the guard tube 42 and threads for the screw 68 are formed in the sleeve 40.

In operation, the cell is filled with the liquid whose properties are to be measured. The level of the liquid in the cell is preferably above the top of the tubes 24, 25 and 28, and the exact level chosen for any particular measurement is determined according to conventional considerations well understood in this art. When the electrode assembly 14 is placed in the holder 12, air within the innermost tube 24 is vented through the slots 32. The slots 56 in the tube 50 provide further vents for air.

In certain well-known tests the cell is subjected to cyclical temperature variations. To avoid cracking of the head member 20 due to an excessive difference between its thermal expansion and that of the tube 50 and the guard tube 42, a formulation is chosen which will minimize this difference. Preferably, the formulation comprises an epoxy resin the thermal expansion of which has been suitably decreased by addition of a filler. Also, the slots 56 in the tube 50 which extend into the resin make the tube readily yieldable with the head member as the latter expands or contracts.

The above-described welded assembly of each of the electrode sets 16 and 18 has been found sufficiently rigid to ensure the accurate spacing of the concentric tubes. While the individual tubes of each electrode set are supported at only one end, the opposite unsupported ends remain in rigidly spaced relationship. This rigidity is imparted by the tabs 30, 34, 52 and 54 which have appreciable length longitudinally of the tubes. The spot welds in each tab are preferably evenly spaced from one end to the other of the longitudinal dimension of the tab. The opposed relationship of the tabs in the two electrode sets makes it possible to fabricate these sets separately and to telescope them during assembly in the mold or fixture preparatory to the molding of the head member 20 and the sleeve 40.

The foregoing assembly has also been found extremely rugged, easy to clean and free of errors encountered in prior art cells when air bubbles are entrapped between the electrodes.

It will be obvious that the number of concentric tubes in each electrode set can be varied according to the principles of construction heretofore described, in order to produce any desired capacitance.

The embodiment of FIG. 6 illustrates an alternative construction in which the tabs between the tubes forming each electrode set are replaced by dimples 76 without cutting or breaking the metal. It will be understood that one or more openings near the top of the tube 24 will be made to vent the air. The dimples are formed in a manner similar to the dimples 64 and the portions thereof contacting the wall of the next outer tube are preferably spot welded thereto. In order to ensure that the tubes in each set are coaxial as assembled, the dimples 76 in each tube may comprise three or more pairs, the dimples of each pair being somewhat longitudinally displaced preferably within limits comparable to the longitudinal dimensions of the tabs in the embodiment of FIG. 1.

It will be understood that the foregoing and other alternatives and variations on the preferred embodiment of the invention herein described may be adapted and carried out by one skilled in this art without departing from the spirit or scope of this invention, after having understood the teachings hereinabove set forth.

Having thus described the invention, I claim:

1. A test cell for measuring electrical properties of liquids having in combination, a holder having an opening to receive a sample of liquid and an electrode assembly to fit within and close said opening, said assembly including a molded insulating head member forming a closure for said opening, a rod imbedded centrally in the head member and extending therefrom into the space within the holder and being provided with electrical terminal means external to the head member, a tubular guard element and a tubular outer electrode element both provided with electrical terminal means external to the head member and being imbedded coaxially with the rod in the head member and extending therefrom into the space within the holder, said outer eletrode element exceeding the guard element in diameter, first and second pluralities of tubular elements within the holder, the elements of each plurality being mutually and concentrically conjoined mechanically and electrically at a single common end, the conjoined end of one of said pluralities being joined mechanically and electrically concentrically with and to said rod and the conjoined end of the other of said pluralities being joined mechanically and electrically concentrically with and to said outer electrode element, the tubular elements of said pluralities being telescoped in regularly spaced, alternating sequence with the conjoined end of the first plurality nearer the head member and the conjoined end of the second plurality further from the head member, the head member forming the sole support for both said pluralities of elements.

2. The combination according to claim 1, wherein the end of the guard tube within the holder is closer to the head member than either plurality of tubular elements.

3. The combination according to claim 1, wherein an opening is provided in the wall of the outer electrode element to permit the escape of gases therefrom to the space in the cell external thereto.

References Cited in the file of this patent

UNITED STATES PATENTS

| | | |
|---|---|---|
| 1,725,639 | Herman | Aug. 20, 1929 |
| 2,599,583 | Robinson | June 10, 1952 |
| 2,740,927 | Jennings | Apr. 3, 1956 |
| 2,800,628 | Stinson | July 23, 1957 |

FOREIGN PATENTS

| | | |
|---|---|---|
| 428,639 | Great Britain | May 16, 1935 |